United States Patent
Moore et al.

(10) Patent No.: US 10,913,528 B1
(45) Date of Patent: *Feb. 9, 2021

(54) SAFE VERTICAL TAKE-OFF AND LANDING AIRCRAFT PAYLOAD DISTRIBUTION AND ADJUSTMENT

(71) Applicant: Uber Technologies, Inc., San Francisco, CA (US)

(72) Inventors: Mark Moore, San Francisco, CA (US); John Conway Badalamenti, San Francisco, CA (US); Ian Villa, San Francisco, CA (US); Adam Warmoth, San Francisco, CA (US); David Josephson, Santa Cruz, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,999

(22) Filed: Feb. 11, 2019

Related U.S. Application Data

(63) Continuation-in-part of application No. 16/178,506, filed on Nov. 1, 2018.
(Continued)

(51) Int. Cl.
*B64C 17/08* (2006.01)
*B64C 29/00* (2006.01)
(Continued)

(52) U.S. Cl.
CPC .......... *B64C 17/08* (2013.01); *B64C 29/0016* (2013.01); *B64D 11/003* (2013.01);
(Continued)

(58) Field of Classification Search
CPC ......... B64C 17/02; B64C 17/08; B64C 17/10; B64B 1/38; B64F 1/30; G01M 1/127; G01M 1/125; G06G 7/70
See application file for complete search history.

(56) References Cited

U.S. PATENT DOCUMENTS

| | | | |
|---|---|---|---|
| 6,923,375 B2 * | 8/2005 | Stefani | G01G 19/07 702/175 |
| 7,198,223 B2 * | 4/2007 | Phelps, III | B64C 27/10 244/17.11 |

(Continued)

*Primary Examiner* — Richard R. Green
(74) *Attorney, Agent, or Firm* — Merchant & Gould P.C.

(57) ABSTRACT

Vertical take-off and landing (VTOL) aircraft can provide opportunities to incorporate aerial transportation into transportation networks for cities and metropolitan areas. However, VTOL aircraft can be sensitive to uneven weight distributions, e.g., the payload of an aircraft is primarily loaded in the front, back, left, or right. When the aircraft is loaded unevenly, the center of mass of the aircraft may shift substantially enough to negatively impact performance of the aircraft. Thus, in turn, there is an opportunity that the VTOL may be loaded unevenly if seating, luggage placement, and/or positions of internal components are not coordinated. Among other advantages, dynamically assigning the payloads and adjusting components of the VTOL aircraft can increase VTOL safety by ensuring the VTOL aircraft is loaded evenly and meets all weight requirements; can increase transportation efficiency by increasing rider throughput; and can increase the availability of the VTOL services to all potential riders.

20 Claims, 10 Drawing Sheets

---

900

Receive payload information for a VTOL aircraft, the payload information including a weight and assigned location of one or more payload items
910

↓

Retrieve weight distribution criteria for the VTOL aircraft
920

↓

Determine an adjustment of a weight distribution of an internal component based on the payload information and the weight distribution criteria
930

↓

Send an instruction to an actuator to change the weight distribution of the internal component according to the determined adjustment
940

Related U.S. Application Data

(60) Provisional application No. 62/581,627, filed on Nov. 3, 2017.

(51) Int. Cl.
    *B64D 11/06*     (2006.01)
    *B64D 11/00*     (2006.01)
    *G01G 19/07*     (2006.01)

(52) U.S. Cl.
    CPC ...... *B64D 11/0639* (2014.12); *B64D 11/0649* (2014.12); *G01G 19/07* (2013.01)

(56) References Cited

U.S. PATENT DOCUMENTS

| | | | | |
|---|---|---|---|---|
| 8,068,975 | B2 * | 11/2011 | Jensen | G01M 1/125 |
| | | | | 701/124 |
| 8,185,234 | B2 * | 5/2012 | Tietjen | G01M 1/125 |
| | | | | 235/384 |
| 9,738,396 | B2 * | 8/2017 | Regan | G01M 1/125 |
| 10,040,553 | B2 * | 8/2018 | Frolov | B64C 29/0025 |
| 2015/0241295 | A1 * | 8/2015 | Fuscone | G01M 1/127 |
| | | | | 701/124 |
| 2016/0098930 | A1 * | 4/2016 | Dillingham | G01S 19/13 |
| | | | | 715/772 |
| 2016/0267398 | A1 * | 9/2016 | Taylor | G06Q 10/02 |
| 2018/0354610 | A1 * | 12/2018 | Kneuper | G01M 1/127 |
| 2019/0111806 | A1 * | 4/2019 | Camuti | B64D 11/0602 |

* cited by examiner

VTOL
120

SAFE VERTICAL TAKE-OFF AND LANDING AIRCRAFT PAYLOAD DISTRIBUTION AND ADJUSTMENT

CROSS-REFERENCE TO RELATED APPLICATIONS

This application is a continuation-in-part of pending U.S. patent application Ser. No. 16/178,506 titled "Safe Vertical Take-Off and Landing Aircraft Payload Assignment," filed Nov. 1, 2018, now U.S. Pat. No. 10,752,363 which claims the benefit of U.S. Provisional Patent Application Ser. No. 62/581,627, titled "VTOL Passenger Aircraft," filed Nov. 3, 2017. These applications are incorporated by reference in their entirety.

BACKGROUND

The present disclosure relates to aviation transport, and specifically, to dynamic vertical take-off and landing (VTOL) aircraft payload assignment.

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

SUMMARY

Some embodiments relate to dynamic payload assignment for vertical take-off and landing (VTOL) aircraft. A vertical take-off and landing (VTOL) aircraft transport request is received, the request identifying a rider. A weight estimate of a payload associated with the rider is received. The payload associated with the rider is assigned to a VTOL aircraft based on the weight estimate and weight distribution criteria for the VTOL aircraft. A weight update of the payload associated with the rider is received. The payload associated with the rider is reassigned based on the weight update and the weight distribution criteria.

In one embodiment, payload information for a vertical take-off and landing (VTOL) aircraft is received. The payload information includes a weight and assigned location of one or more payload items. Weight distribution criteria for the VTOL aircraft is retrieved from a data store. An adjustment of a weight distribution of an internal component of the VTOL aircraft is determined based on the payload information and the weight distribution criteria. An instruction is sent to an actuator to change the weight distribution of the internal component according to the determined adjustment.

Figure 1:
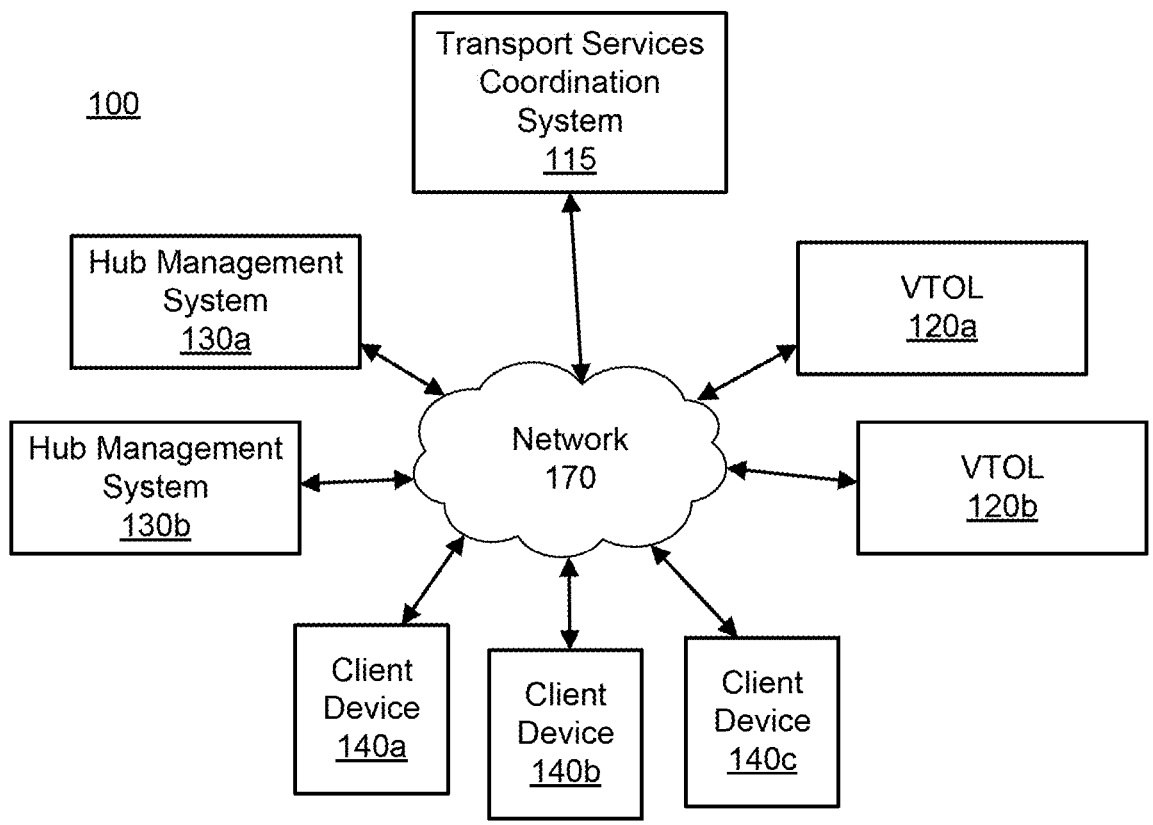
FIG. 1 illustrates a computing environment associated with an aviation transport network, according to an embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Vertical take-off and landing (VTOL) aircraft can provide opportunities to incorporate aerial transportation into transportation networks for cities and metropolitan areas. However, VTOL aircraft are weight sensitive. In particular, VTOL aircraft can be sensitive to uneven weight distributions, e.g., the payload of an aircraft is primarily loaded in the front, back, left, or right. When the aircraft is loaded unevenly, the center of mass of the aircraft may shift substantially enough to negatively impact performance of the aircraft. Because each rider may have or may not have personal items such as luggage, the payload associated with each rider may be highly variable. Thus, in turn, there is an opportunity that the VTOL may be loaded unevenly if seating, luggage placement, and/or positions of internal components are not coordinated.

To accommodate this, weight estimates of payloads associated with riders requesting transportation can be received to facilitate safe loading of VTOLs. For example, a rider may optionally allow (or alternatively prevent) payload information to be provided to a transport services coordination system (e.g., system 115 in FIG. 1). The transport services coordination system can assure that rider-to-VTOL assignments result in the VTOL's weight distribution criteria being within safe operational ranges. Riders can be assigned to a VTOL aircraft based on weight estimates of payloads associated with the riders and weight distribution criteria of the VTOL aircraft. Prior to take-off, weight updates of the payloads can be received and result in payload adjustments. Furthermore, the positions of internal components, such as seats, cooling fluid, etc., can be adjusted to satisfy the weight distribution criteria of the VTOL aircraft. Among other advantages, dynamically assigning the payloads and dynamically adjusting components of the VTOL aircraft can increase VTOL safety by ensuring the VTOL aircraft is loaded evenly and meets all weight requirements; can increase transportation efficiency by increasing rider throughput; and can increase the availability of the VTOL services to all potential riders.

Example System Environment

FIG. 1 illustrates a computing environment 100 associated with an aviation transport network, according to an embodiment. In the embodiment shown in FIG. 1, the computing environment 100 includes a transport services coordination system 115, a set of vertical take-off and landing (VTOL) aircraft 120a, 120b, a set of hub management systems 130a, 130b and a set of client devices 140a, 140b, 140c all connected via a network 170. Where multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 100 contains different and/or additional elements. In addition, the functions may be distributed among the elements in a different manner than described.

The transport services coordination system 115 coordinates transport services for a set of VTOL hubs. The transport services coordination system 115 pairs riders who request transport services (riders) with specific VTOL aircraft 120. The transport services coordination system 115 may also interact with ground-based transportation to coordinate travel services. For example, the transport services coordination system 115 may be an extension of an existing transport services coordinator, such as a ridesharing service.

In one embodiment, the transport services coordination system 115 treats a journey involving a VTOL aircraft 120 as having three legs: (1) from the rider's initial location to a first hub; (2) from the first hub to a second hub in a VTOL; and (3) from the second hub to the rider's destination. The first and third legs may be walking or provided by ground transportation, such as a ride-sharing service. The transport services coordination system 115 provides routing information to VTOL aircraft 120, such as what time to leave a current hub, which hub to fly to after departure, way points along the way, how long to spend charging before departure or on arrival, and the identity of individuals to carry. The transport services coordination system 115 may also direct certain VTOL aircraft 120 to fly between hubs without riders to improve fleet distribution (referred to as "deadheading"). Various embodiments of the transport services coordination system 115 are described in greater detail below, with reference to FIG. 2.

The VTOL aircraft 120 are vehicles that fly between hubs in the transport network. A VTOL aircraft 120 may be controlled by a human pilot (inside the vehicle or on the ground) or it may be autonomous. In one embodiment, the VTOL aircraft 120 are battery-powered aircraft that use a set of propellers for horizontal and vertical thrust. The configuration of the propellers enables the VTOL aircraft to take-off and land vertically (or substantially vertically). For convenience, the various components of the computing environment 100 will be described with reference to this embodiment. However, other types of aircraft may be used, such as helicopters, planes that take-off at angles other than vertical, and the like. The term VTOL should be construed to include such vehicles.

A VTOL aircraft 120 may include a computer system that communicates status information (e.g., via the network 170) to other elements of the computing environment 100. The status information may include current location, current battery charge, potential component failures, and the like. The computer system of the VTOL aircraft 120 may also receive information, such as routing information and weather information. Although two VTOL aircraft 120 are shown in FIG. 1, a transport network can include any number of VTOL aircraft.

A hub management system 130 provides functionality at a hub in the transport network. A hub is a location at which VTOL aircraft 120 are intended to land (and take-off). Within a transport network, there may be different types of hub. For example, a hub in a central location with a large amount of rider throughput might include sufficient infrastructure for sixteen (or more) VTOL aircraft 120 to simultaneously (or almost simultaneously) take off or land. Similarly, such a hub might include multiple charging stations for recharging battery-powered VTOL aircraft 120. In contrast, a hub located in a sparely populated suburb might include infrastructure for a single VTOL aircraft 120 and have no charging station. The hub management system 130 may be located at the hub or remotely and be connected via the network 170. In the latter case, a single hub management system 130 may serve multiple hubs.

In one embodiment, a hub management system 130 monitors the status of equipment at the hub. For example, if there is a fault in a charging station, the hub management system 130 may automatically report that it is unavailable for charging VTOL aircraft 120 and request maintenance or a replacement. The hub management system 130 may also control equipment at the hub. For example, in one embodiment, a hub includes one or more launch pads that may move from a takeoff/landing position to embarking/disembarking position. The hub management system 130 may control the movement of the launch pad (e.g., in response to instructions received from transport services coordination system 115 and/or a VTOL aircraft 120).

The client devices 140 are computing devices with which riders may arrange transport services within the transport network. Although three client devices 140 are shown in FIG. 1, in practice, there may be many more (e.g., thousands or millions of) client devices connected to the network 170. In one embodiment, the client devices 140 are mobile devices (e.g., smartphones, tablets, etc.) running an application for arranging transport services. A rider provides a pickup location and destination within the application and the client device 140 sends a request for transport services to the transport services coordination system 115. Alternatively, the rider may provide a destination and the pickup location is determined based on the rider's current location (e.g., as determined from GPS data for the client device 140).

Regardless of how they are generated, the transport services coordination system 115 determines how to service transport requests. In one embodiment, a transport request can be serviced by a combination of ground-based and aerial transportation. The transport services coordination system 115 sends information about how the request will be serviced to the rider's client device (e.g., what vehicle the rider should get into, directions on where to walk, if necessary, etc.). Various embodiments of how the transport services coordination system 115 services transport requests are described in greater detail below, with reference to FIG. 7.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Transport Services Coordination

Figure 2:
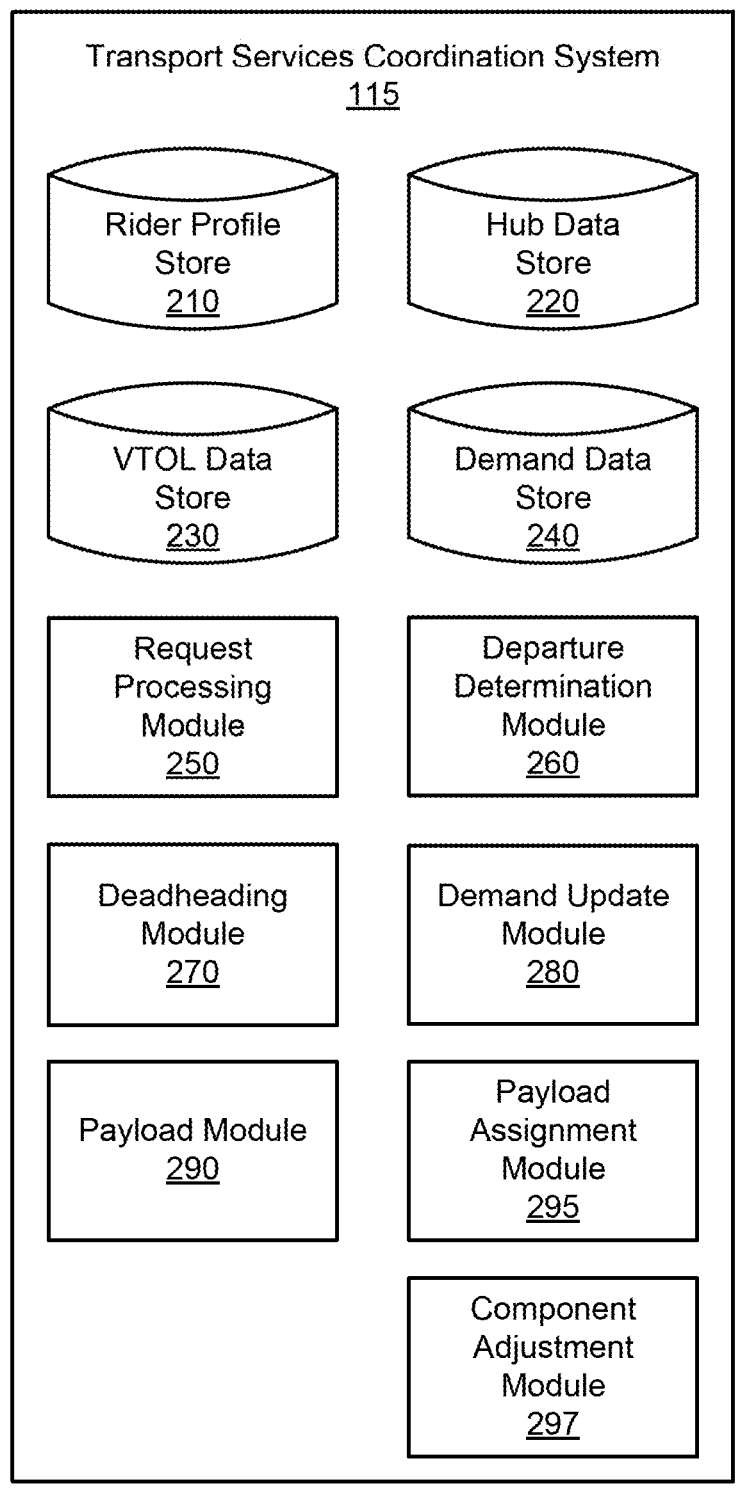
FIG. 2 illustrates the transport services coordination system, according to an embodiment.

FIG. 2 illustrates the transport services coordination system 115, according to an embodiment. The transport services coordination system 115 services requests for transport services from riders by pairing them with itineraries. An itinerary is a set of one or more interconnected travel legs that collectively begin at an origin specified in a request and end at a destination specified in the request. The legs may be entirely ground-based (including walking) or involve one or more VTOL-serviced legs. In the embodiment shown in FIG. 2, the transport services coordination system 115 includes a rider profile store 210, a hub data store 220, a VTOL data store 230, a demand data store 240, a request processing module 250, a departure determination module 260, a deadheading module 270, a demand update module 280, a payload module 290, a payload assignment module 295, and a component adjustment module 297. In other embodiments, the transport services coordination system 115 contains different and/or additional elements. In addition, the functions may be distributed among the elements in a different manner than described.

The rider profile store 210 is one or more computer-readable media configured to store rider profile data according to user permissions. In one embodiment, each rider sets up a rider profile with the transport services coordination system 115 (e.g., using an app running on a client device 140). In one embodiment, a rider profile includes an identifier of the rider (e.g., a unique ID number) and information provided by the rider, such as a name, expected payload, payment information (e.g., a credit card to which fees for transport services should be charge), a profile picture, and the like. The rider profile may also include preferences, such as availability of Wi-Fi on VTOL aircraft 120, a preferred direction for seats to face, and the like.

The hub data store 220 is one or more computer-readable media configured to store information about the hubs in the transport network. In one embodiment, the information about a given hub includes: an identifier of the hub (e.g., a name or ID number), a location (e.g., latitude and longitude, GPS coordinate, etc.), the number of VTOL launch pads at the hub, and the number of VTOL storage bays at the hub, the number of charging stations available at the hub (which may be zero). In other embodiments, the information about a given hub may include different or additional information.

The VTOL data store 230 is one or more computer-readable media configured to store information about the VTOL aircraft 120 available in the transport network. In one embodiment, the information about a given VTOL aircraft 120 includes: an identifier of the VTOL (e.g., a name or ID number), a current (or most recently reported) location, the number of seats available to riders, a maximum payload weight capacity, a maximum flight length, a current (or most recently reported) battery level, a current destination hub, a list of currently assigned riders, a list of riders currently aboard, and the like. Current information such as location, battery level, and riders currently aboard may be provided by a computer system aboard the VTOL aircraft 120 or may be reported by a hub management system 130 when the VTOL aircraft takes off from the corresponding hub and then estimated based on a time since departure. For example, the current battery charge of the VTOL aircraft 120 may be estimated by assuming it depletes at an expected rate.

The VTOL data store 230 may store weight distribution criteria for VTOL aircraft 120 available in the transport network. In some embodiments, each VTOL aircraft 120 is associated with weight distribution criteria to enable assignments of riders and luggage to VTOL aircraft 120 that avoid excessively uneven weight distributions that may cause operational or safety problems. The weight distribution criteria can include a maximum weight threshold and a weight distribution threshold.

The demand data store 240 is one or more computer-readable media configured to store information about demand for VTOL transport services (demand data). In various embodiments, the demand data includes an expected number of riders for each pair of hubs in the transport network in a given time period. For example, the demand data might indicate that ten riders per hour are expected to travel from Hub X to Hub Y, while only four riders an hour are expected to travel from Hub Y to Hub X.

The expected number of riders between two hubs may be an overall average. Alternatively, the demand data store 240 may store multiple values for each pair of hubs corresponding to different time periods, such as one value for each hour of the day. The demand data may also distinguish between weekends and weekdays, different days of the week, different months of the year, etc., storing different sets of values for each. For example, for a given hub, the demand data might include an expected number of riders for each hour of the day on weekdays and each hour of the day on weekends.

The request processing module 250 processes requests for transport services from riders and pairs those riders with itineraries. In various embodiments, a rider requests transport services using a client device 140 (e.g., via an app). The request includes an origin and a destination. The origin may be entered by the rider or determined from the location of the client device 140 (e.g., as established from GPS data). In some embodiments, the request is an explicit request for VTOL transport services. The request processing module 250 establishes an itinerary for the rider, which may include a single ground-based leg or a pair of ground-based legs either side of a VTOL leg. In some instances, one or both of the ground-based legs on either side of a VTOL leg may be omitted (e.g., an itinerary may be from one hub to another). In other embodiments, itineraries may include additional legs. For example, an itinerary might include two VTOL legs with a "layover" at a hub in between.

In one embodiment, the request processing module 250 determines a ground-based itinerary and a VTOL itinerary and selects the VTOL itinerary if it is predicted to save more than a threshold amount of time relative to the ground-based itinerary (e.g., 40%). In some instances, the fastest VTOL itinerary might not depart from the hub nearest the origin or arrive at the hub nearest the destination. For example, traffic or road layout may make traveling from the origin to a geographically close departure hub take longer than reaching a hub that is further away, or there may not be a VTOL aircraft 120 available at the nearest hub, etc. Therefore, the request processing module 250 may consider each departure hub and arrival hub within a threshold distance of the origin and destination, respectively, and determine an itinerary for each. The itinerary with the earliest arrival time at the destination may then be selected. If the rider's profile includes preferences, a penalty may be applied to itineraries that do not comply with those preference. For example, if the rider prefers forward-facing seats, the shortest itinerary might be rejected if it includes a leg with a backward-facing seat and a slightly longer itinerary with all forward-facing seats is available. In other embodiments, other ways of pairing riders with itineraries may be used.

Regardless of how the itinerary is generated and selected, the request processing module 250 sends itinerary information to the rider (e.g., to the rider's client device 140). In one embodiment, the itinerary information for a VTOL-serviced request identifies a ground-based vehicle that will pick the rider up at their origin (or instructs the rider to walk to the departure hub), identifies a VTOL aircraft 120 the rider should board, and identifies a ground-based vehicle that will drop the rider off at their destination (or instructs the rider to walk to the destination from the arrival hub). In the case of one or more of the legs being walking legs, the rider's client device 140 may provide walking directions to the rider. In another embodiment, the precise VTOL 120 or ground-based vehicle that will service the second and third leg of the itinerary, respectively, may not be identified until the rider is en route. For example, the request processing module 250 may not identify the specific ground-based vehicle that will pick the rider up at the arrival hub until the VTOL-serviced leg is underway. Among other advantages this may allow greater flexibility in the transport network and greater rider throughput.

The request processing module 250 also sends instructions to the vehicle or vehicles that will service the itinerary. In one embodiment, for a VTOL leg, the request processing module 250 sends information about the rider (e.g., the rider's identity, a picture of the rider, etc.) as well as an expected boarding time for the rider and the destination hub to a computer-system of the VTOL aircraft 120. If the VTOL aircraft 120 is not already located at or en route to the departure hub, the request processing module 250 may also direct the VTOL aircraft to go to that hub (e.g., as a deadhead flight or with less than a full complement of riders). Alternatively, the information may be sent to a client device 140 associated with the pilot of the VTOL aircraft 120 (assuming it has one).

For ground-based legs, the request processing module 250 may similarly send instructions to a ground-based vehicle (or a client device 140 associated with the driver of the vehicle) identifying the rider as well as pick-up and drop-off locations. Alternatively, the request processing module 250 may send out an invitation to one or more vehicles (or driver client devices 140) to provide the transport services. In this case, the rider is paired with a vehicle for which the driver accepts the invitation. For example, the first leg of an itinerary from a rider's origin to the departure hub may be serviced by a car via a ridesharing service.

The payload module 290 provides weight estimates and weight updates for payloads associated with riders. Weight estimates and weight updates may be referred to as payload information. These weight values may be used to assign and reassign payloads associated with riders to VTOL aircraft 120. When the rider arrives at the departure hub, the rider beings the boarding process. The boarding process may include verifying information about the rider, including confirming the weight for the payload associated with the rider. The weight of the payload associated with the rider may be used to more accurately forecast the amount of battery power the VTOL flight will require and also, as further described below, help ensure that the VTOL aircraft 120 is not excessively unbalanced (e.g., with heavier luggage all located on the same side of the VTOL aircraft). The payload module 290 is further described with reference to FIG. 3.

The payload assignment module 295 dynamically assigns riders to VTOL aircraft 120 who have been paired with VTOL itineraries (a VTOL itinerary paired with a rider may be referred to as VTOL transport request). Specifically, the payload assignment module 295 assigns riders and their luggage to VTOL aircraft 120 and to positions within the aircraft VTOL 120 This may allow greater flexibility and network throughput efficiency within a transportation network. Among other factors, the payload assignment module 295 provides assignments to payloads associated with riders based on weight distribution criteria. For safety, each VTOL aircraft 120 is associated with weight distribution criteria to ensure the aircraft is not overweight or that its weight is not excessively unevenly distributed. The weight distribution criteria can include a maximum weight threshold and a weight distribution threshold.

The maximum weight threshold defines a maximum total payload weight of a VTOL aircraft 120. If the total payload weight of a VTOL aircraft 120 exceeds the maximum weight threshold of the aircraft, the aircraft may be unsafe to take-off. For example, if a VTOL aircraft 120 has a maximum weight threshold of 500 pounds (lbs.) and the total weight of the riders and their luggage aboard the aircraft is greater than 500 lbs., the aircraft may be unsafe for take-off. The weight distribution threshold defines the weight distribution limits of a VTOL aircraft 120. For example, the weight distribution threshold may define a safe range of positions for the center of gravity of the VTOL aircraft 120. If the distribution of the totally payload weight of a VTOL aircraft 120 exceeds the weight distribution threshold of the aircraft, the aircraft may be unsafe to take-off. For example, if 90% of the total payload weight of a VTOL aircraft 120 is positioned on the left side of the aircraft, the aircraft may be unsafe for take-off. The total payload weight and payload weight distribution of a VTOL aircraft may be determined from one or more sensors on the VTOL aircraft, such as weight sensors (e.g., in the landing gear) and balance or orientation sensors. For example, after a payload is loaded onto an aircraft, the change in orientation and height of the aircraft can be related to the total payload weight and/or weight distribution of the VTOL aircraft 120.

The payload assignment module 295 can match riders to VTOL aircraft 120 such that the weight distribution criteria of each aircraft is satisfied. The weight distribution criteria may be satisfied by assigning riders to aircraft such that the total payload weight (based on weight estimates from the payload module 290) of each aircraft does not exceed the maximum weight thresholds of each aircraft. The weight distribution criteria may be satisfied by assigning riders to aircraft such that the weight distribution of each aircraft does not exceed the weight distribution thresholds of each aircraft.

After riders are assigned to VTOL aircraft 120, riders may be reassigned based on weight updates from the payload module 290. Riders and their luggage can be reassigned to different VTOL aircraft and different position assignments. Based on the weight updates, one or more VTOL aircraft 120 may not satisfy their weight distribution criteria. For example, the total payload weight of the one or more VTOL aircraft 120 may exceed the maximum weight thresholds of the aircraft. Thus, based on received weight updates, riders and their luggage may be reassigned such that the VTOL aircraft 120 satisfy their weight distribution criteria. For example, the seat assignments of one or more riders are reassigned to satisfy the weight distribution thresholds. The weight distribution criteria can also include a maximum space threshold. Since VTOL aircraft 120 have limited cabin and luggage space, the payload assignment module 295 can consider payload dimensions when assigning or reassigning riders to a VTOL aircraft 120. For example, the payload assignment module 295 can determine if a group of payloads associated with riders are volumetrically eligible to be assigned to a single VTOL aircraft 120.

To avoid rider confusion, in some embodiments, riders are not informed of their VTOL aircraft 120 assignments and position (e.g., seat) assignments until the likelihood of reassignment is below a threshold. For example, one or more weight updates have been received and the weight distribution criteria of the aircraft are satisfied.

The component adjustment module 297 can issue instructions that cause the adjustment of components of the VTOL aircraft 120 to modify the weight distribution of the VTOL aircraft 120. The component adjustment module 297 can work in conjunction with the payload assignment module 295. After payloads associated with riders are assigned (or reassigned) to positions in a VTOL aircraft, the component adjustment module 297 can issue instructions to adjust components of the aircraft to satisfy (or more closely satisfy) the weight distribution criteria of the aircraft. The components may be adjusted and readjusted in various stages (e.g., each time updated payload information is received) until the weight distribution criteria of the VTOL aircraft are satisfied. For example, one or more components are adjusted based on weight estimates of payloads assigned to a VTOL aircraft and readjusted based on weight updates of the assigned (or reassigned) payloads.

In some embodiments, the component adjustment module 297 issues instructions to adjust positions of the seats (e.g., by a few inches in any direction) relative to the body of the aircraft to modify the weight distribution of the VTOL aircraft 120. The seats include actuators (e.g., mechanical actuators and sliders) to shift each of the positions of the seats closer to the front or rear of the aircraft. The seat may also include actuators to move the seat from side to side and up or down in response to instructions from the component adjustment module 297. The seats may be adjusted before and after a rider sits in a seat. For example, a seat position may be adjusted based on weight estimates or updates and readjusted after a rider sits in a seat.

The component adjustment module 297 may also issue instructions to adjust positions of luggage or luggage storage compartments relative to the body of the aircraft to modify the weight distribution of the VTOL aircraft 120. For example, a luggage locker is shifted towards the front of the aircraft to satisfy the weight distribution criteria of the aircraft. Additionally, other internal components, such as batteries, fuel bladders, and counterweights may be similarly shifted to modify the weight distribution of the aircraft.

In some embodiments, component adjustment module 297 can satisfy the weight distribution criteria by sending instructions to supply a fluid to internal ballast tanks (e.g., via one or more actuators). The aircraft may include a set of distributed internal ballast tanks and fluid may be selectively distributed to the ballast tanks such that the weight distribution criteria is satisfied (e.g., the total payload weight is evenly distributed). Among other advantages, the amount of fluid in each ballast tank can be can be monitored and dynamically adjusted to increase VTOL aircraft safety. For example, if one or more passengers move in the aircraft cabin during flight, a safe weight distribution of the VTOL aircraft 120 may be maintained by adjusting the fluid levels in each tank.

In some embodiments, internal ballast tanks may be integrated into the seats of the aircraft. For example, the VTOL aircraft 120 includes stroking seats. Stroking seats are designed to reduce passenger lumbar injury by absorbing impact forces during a vertical impact. However stroking seats may only work for a limited range of passenger weights. Specifically, stroking seats may be ineffective for light weight passengers (e.g., ranging from XX to XX pounds) due to the decreased stroke length during impact. To overcome this, internal ballast tanks may be integrated into the stroking seats and fluid can be supplied to the tanks to add weight to seats with light weight passengers. The amount of fluid in each seat can be based on the passenger weight and seat design. Thus, through internal ballast tanks, stroking seats can improve safety for lighter passengers (e.g., children).

The fluid in the ballast tanks may be internal fluids, such as cooling fluid, fuel, oil, etc. The use of these fluids may be advantageous because they may already be present within the VTOL aircraft 120. For example, while the aircraft is recharging at a VTOL hub, cooling fluid from a ground tank may be cycled through the charging cable to cool the aircraft batteries.

The departure determination module 260 determines whether the VTOL aircraft 120 should take-off immediately or wait for additional riders. In various embodiments, when the rider completes boarding, a confirmation message is sent to the departure determination module 260 (e.g., via the network 170).

The departure determination module 260 balances providing the minimum possible journey time for the rider already boarded (by leaving immediately) with potential savings in average journey time, total battery usage, wear and tear, and the like, that may be realized by waiting for additional people to be paired with the VTOL aircraft 120. In various embodiments, if the VTOL aircraft 120 is full (e.g., every seat is taken), the departure determination module 260 instructs it to leave immediately. Otherwise, the departure determination module 260 determines the likelihood that another rider will be able to be paired with the VTOL aircraft 120 in a threshold time period.

In one embodiment, the threshold time period is set such that, if the VTOL aircraft 120 departs at the end of that time period, the rider already on board would still save at least the threshold amount of time (e.g., 40%) over taking ground-based transportation alone. If another rider has already submitted a request that may be serviced by the VTOL aircraft 120, the departure determination module 260 estimates the arrival time at the hub for that rider and, accounting for the time required for boarding, determines whether the VTOL aircraft 120 can wait and still save the rider who has already boarded at least the threshold amount of time. The analysis can also consider a weight estimate of a payload associated with the rider who submitted the request and weight distribution criteria of the VTOL aircraft 120. In the case where more than one rider has already boarded, the departure determination module 260 may perform this analysis for each boarded rider and instructs the VTOL aircraft 120 to take-off if waiting for the additional rider would reduce the time saved for any already boarded rider below the threshold. The departure determination module 260 may also instruct the VTOL aircraft 120 to take-off if the addition of the rider who submitted the request would result in the VTOL aircraft failing its weight distribution criteria (e.g., based on a weight estimate of a payload associated with the rider).

If no such request has been submitted, the departure determination module 260 can use the demand data (e.g., retrieved from the demand data store 240) to calculate the probability of another rider arriving at the hub with the same destination before the VTOL aircraft 120 must leave to save at least the threshold amount of time for the rider who is already boarded. The VTOL aircraft 120 may be instructed to wait if this probability exceeds a threshold (e.g., 80%). This threshold may be fixed or set by an operator of the transport network. Alternatively or additionally, the rider who is already boarded may be offered a discount based on the time spent waiting for additional riders. For example, the fee for the itinerary might be a certain amount if the rider's travel duration is reduced by 40% or more over ground-based transportation and reduced proportionally with the degree to which that target is not met (e.g., if the travel time is reduced by only 30%, the fee might be reduced by 10%). Alternatively, if the VTOL aircraft 120 initially waits and no further riders have shown up by the time it needs to depart to save the rider who is already boarded 40% on travel time, the VTOL aircraft may depart at that point. In another embodiment, a boarded rider may opt to pay a premium to have the VTOL aircraft 120 leave without waiting.

The deadheading module 270 determines if and when to relocate VTOL aircraft 120 within the transport network without riders on board. In one embodiment, the deadheading module 270 predicts the future distribution of VTOL aircraft 120 in the network based on their current position, existing itineraries, and expected demand (e.g., a prediction of future itineraries). The future distribution of VTOL aircraft 120 can be compared to the expected demand at each hub (e.g., as stored in the demand data store 240). Based on the comparison, the deadheading module 270 may assign a score to each hub indicating to what extent the distribution of VTOL aircraft 120 may not meet the demand in a given time period (e.g., the next hour). For example, a hub might have a score of four if the deadheading module 270 estimates that four requests will not be serviced by a VTOL aircraft 120 in the given time period due to a lack of VTOL aircraft at the hub. The deadheading module 270 may also assign a score to each VTOL aircraft 120 indicating the likelihood that it will not be assigned to service any transport requests if it remains at its current location (or at the location it is currently flying towards, once it has arrived).

The deadheading module 270 determines an overall cost in the network by combining the scores for hubs that are predicted to have unmet demand and the scores indicating likelihood that a VTOL aircraft 120 will remain on the ground. The deadheading module 270 may then apply a network flow analysis to try and minimize the combined score. The components of the score may be weighted depending on the objectives of the operator of the transport network. For example, applying a low weighting to the scores for VTOL aircraft 120 or a high weighting to hubs with unmet demand will reduce total battery at the expense of servicing less transport requests and/or reducing the time savings realized and vice versa. The weightings may pre-determined or set by an operator of the transport network. Where an operator sets the weightings, the deadheading module 270 may give the operators a choice from several presets, such as maximize VTOL usage, maximize transport request coverage, and balanced, and determine the weightings to use based on the selected preset. In other embodiments, different approaches to determining when to relocate VTOL aircraft 120 using deadhead legs may be used.

The demand update module 280 updates the demand data based on information regarding actual transport requests serviced by the transport services coordination system 115. In one embodiment, the demand update module 280 uses data about the transport requests serviced to build a training set and train a machine-learning module (e.g., a neural network). The demand update module 280 divides the data about transport requests serviced into periods of a given length (e.g., one hour) and defines a feature vector for each hub in each period. For example, each feature vector might include: an identifier of the hub, an hour of the day, a day of the week, a month of the year, proximity to special events (e.g., public holidays, sporting events, parades, etc.), maintenance information (e.g., a number of chargers or launch pads unavailable), and the like. These feature vectors can be labelled with the actual demand (i.e., the number of transport requests serviced) through the hub in the corresponding time period. The machine-learning model can then be trained by minimizing a loss function to reproduce the actual demand from the feature vectors as closely as possible.

Payload Module

Figure 3:
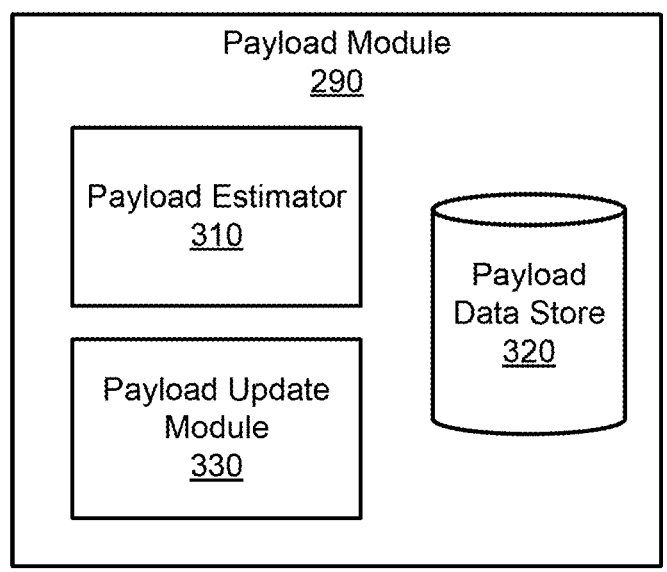
FIG. 3 illustrates the payload module, according to an embodiment.

FIG. 3 illustrates the payload module 290, according to an embodiment. The payload module 290 can serve to improve the safety of the loading of the VTOL aircraft 120. The payload module 290 includes a payload estimator 310, a payload data store 320, and a payload update module 330. In other embodiments, the payload module 290 includes different and/or additional elements. In addition, the functions may be distributed among the elements in a different manner than described.

The payload estimator 310 receives and/or determines weight estimates of payloads associated with riders who have been paired with VTOL itineraries. A weight estimate is an estimate of payload associated with a rider. A payload associated with a rider is a rider's weight contribution (e.g., any combination of the rider weight and luggage weight) to a total payload of a VTOL aircraft 120. A weight estimate can include an estimate of a payload associated with a single a rider. Alternatively a weight estimate can include an estimate of a payload associated with a group of riders. A weight estimate can also include an estimate of dimensions of a payload associated with a rider because VTOL aircraft can have different size storage compartments and cabin spaces. For example, a large suitcase filled with feathers may not present a weight problem but there may not be enough space for the suitcase in the aircraft. Based on weight estimates from the payload estimator 310, riders and their luggage may be assigned to VTOL aircraft 120. Furthermore, riders and their luggage may be assigned to locations (e.g., seats) within the VTOL aircraft 120.

Weight estimates can be determined from any number of information sources. Among other sources, weight estimates can be determined from rider submissions. For example, a rider may submit (e.g., through a client device 140) their luggage weight and dimensions. Weight estimates may be based on a predetermined estimate. For example, a weight estimate can be assigned to a payload associated with a rider that corresponds to the average weight of a child or an adult. Weight estimates can be based on weight data stored (user permissions allowing) in the rider profile store 210 or the payload data store 320. For example, a rider weight submission may be stored for reference so that the rider does not need to provide a new submission for each VTOL itinerary. In another example, a weight measurement taken during a previously completed VTOL itinerary may be stored in the payload data store 320 and used as a weight estimate. Weight estimates may be based on additional criteria, such as day of the week, time of day, month, proximity in time/location to special events or holidays, weather conditions, etc. For example, riders may have more (or heavier) luggage when traveling during weekends than during weekdays. In another example, riders may have heavier luggage close to national holidays. In some embodiments, weight estimates (or weight updates) are based on pictures or video voluntarily submitted by a rider. For example, after a rider submits a picture or video, an object identifier (e.g., enabled by a neural net or some other classification algorithm) can estimate the weight and volume of the rider's luggage.

The payload update module 330 receives and/or determines weight updates of payloads associated with riders assigned to VTOL itineraries. A weight update is an update to a weight estimate of a payload. A weight update of the payload can be a result from a direct weight measurement or rider submission provided the rider permits such access. For example, weight scales located at hubs can be used to determine weight updates for payloads associated with riders. In another example, a weight estimate of a rider's bag (e.g., based on dimensions or historical luggage weight) is updated as a result of a rider submission. Any number of weight updates may be received prior to take-off. Weight updates can be used by the payload assignment module 295 to reassign riders to different VTOL aircraft 120 and seat positions. For example, the weight estimate associated with a rider en route to a hub might be based upon the rider's submission. Based on the weight estimate, the rider is assigned to a VTOL aircraft 120. However, after receiving a weight update (e.g., a scale weighed the rider's luggage), the rider and their luggage may be assigned to a different VTOL aircraft 120 or a different seat on the same VTOL aircraft. In some embodiments, weight updates are received once riders are on board the VTOL aircraft 120. For example, weight and balance sensors in the VTOL aircraft determine one or more weight updates. If weight estimates include the combined weight of a rider and their luggage, in some embodiments, weight updates decouple the weight of a rider from the weight of their luggage to further facilitate ensuring safe payload distribution. For example, a weight update (e.g., determined once riders are seated and their luggage is stored in a luggage compartment) determines the weights of the riders and the weight of their luggage.

The payload data store 320 is one or more computer-readable media configured to store weight data (this weight data may be referred to as historical weight data) in accordance with user permissions. The payload data store 320 stores weight data such as weight estimates and weight updates. The weight data may be used to determine weight estimates associated with riders paired with VTOL itineraries. For example, a weight update associated with a rider from a completed VTOL itinerary may be used as a weight estimate when the rider is paired with another VTOL itinerary. For a given rider and in accordance with user permissions, the payload data store 320 can store multiple weight entries. For example, a rider traveling during the weekend may have lighter luggage than when the rider travels during weekdays. In some embodiments, the payload data store 320 is a part of the rider profile store 210.

In some embodiments, the payload module 290 uses historical weight data to build a training set and train a machine-learning module (e.g., a neural network) to determine weight estimates. A feature vector can include: rider weight submissions, rider characteristics, an identifier of the hub, an hour of the day, a day of the week, a month of the year, proximity to special events (e.g., public holidays, sporting events, parades, etc.), weather conditions, and the like. These feature vectors can be labelled with weight updates (e.g., measured by a scale) through the hub in the corresponding time period. The machine-learning model can then be trained by minimizing a loss function to reproduce the weight updates from the feature vectors as closely as possible.

Figure 4:
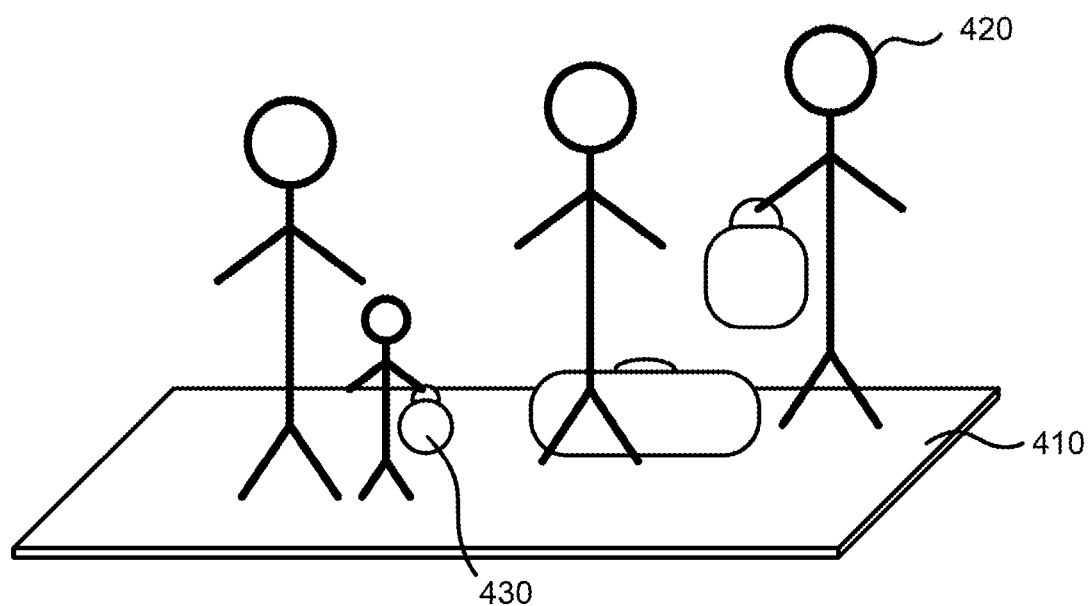
FIG. 4 is an illustration of riders and their luggage being voluntarily weighed on a scale, according to an embodiment.

FIG. 4 is an illustration of riders 420 and their luggage 430 being voluntarily weighed on a scale 401, according to an embodiment. The weighing process is part of the process to facilitate ensuring safe loading of a VTOL aircraft 120. The illustration includes four riders 420 and three separate pieces of luggage 430 being weighed on the scale 410. The scale 410 can be a different size and/or shape than the scale 410 illustrated in FIG. 4.

The scale 410 can be used to determine one or more weight updates of payloads associated with riders 420. The scale 410 is a sensor that determines the weight of payloads placed on the scale 410. For example, the scale 410 is a floor plate weight sensor. The scale 410 can be located at a hub and used during the boarding process. For example, payloads associated with the riders 420 are weighted before boarding a VTOL aircraft 120. Scales 410 can also be located at or near security scanners, boarding gates, ticket counters, VTOL aircraft 120 landing pads, etc.

In some embodiments, VTOL aircraft 120 include scales. For example, a VTOL aircraft 120 includes scales in the landing gear such that the total payload weight and weight distribution can be determined once riders and their luggage are inside the VTOL aircraft 120. This may be useful because different options for redistributing weight are available for the rider and the luggage. For example, as described above, the rider's seat may be moveable whereas the luggage may be moved from one compartment to another (e.g., on the other side of the VTOL aircraft 120).

Example VTOL Aircraft

Figure 5:
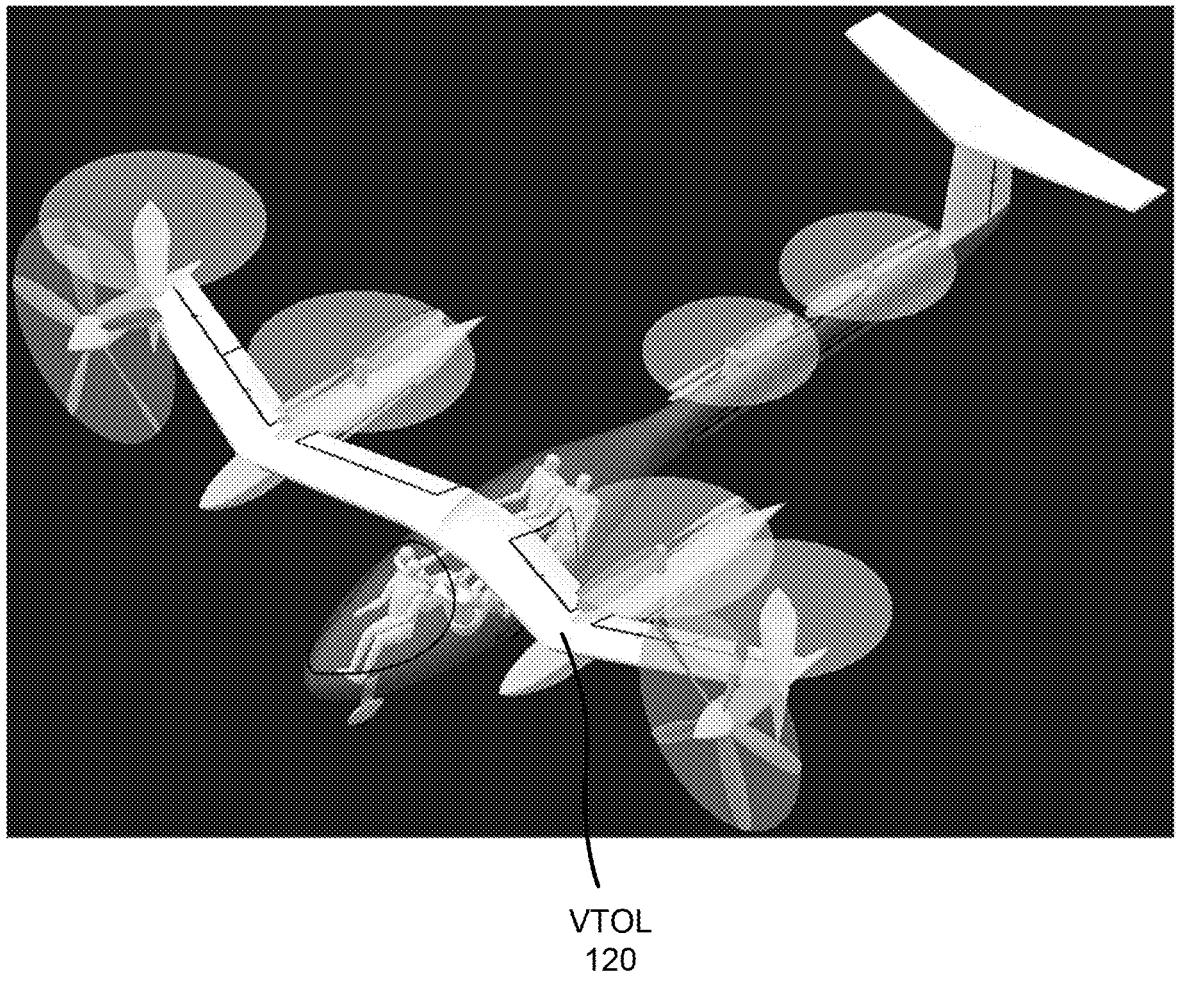
FIG. 5 illustrates an electric VTOL aircraft, according to an embodiment.

FIG. 5 illustrates an electric VTOL aircraft 120, according to an embodiment. In the embodiment shown in FIG. 5, the VTOL aircraft 120 is a battery-powered aircraft that transitions from a vertical take-off and landing state with stacked lift propellers to a cruise state on fixed wings.

The VTOL aircraft 120 has an M-wing configuration such that the leading edge of each wing is located at an approximate midpoint of the wing. The wingspan of a VTOL aircraft 120 includes a cruise propeller at the end of each wing, a stacked wing propeller attached to each wing boom behind the middle of the wing, and wing control surfaces spanning the trailing edge of each wing. At the center of the wingspan is a fuselage with a rider compartment that may be used to transport riders and/or cargo. The VTOL aircraft 120 further includes two stacked tail propellers attached to the fuselage tail boom.

During vertical assent of the VTOL aircraft 120, rotating wingtip propellers on the nacelles are pitched upward at a 90-degree angle and stacked lift propellers are deployed from the wing and tail booms to provide lift. The hinged control surfaces tilt to control rotation about the vertical axis during takeoff. As the VTOL aircraft 120 transitions to a cruise configuration, the nacelles rotate downward to a zero-degree position such that the wingtip propellers are able to provide forward thrust. Control surfaces return to a neutral position with the wings, tail boom, and tail, and the stacked lift propellers stop rotating and retract into cavities in the wing booms and tail boom to reduce drag during forward flight.

During transition to a descent configuration, the stacked propellers are redeployed from the wing booms and tail boom and begin to rotate along the wings and tail to generate the lift required for descent. The nacelles rotate back upward to a 90-degree position and provide both thrust and lift during the transition. The hinged control surfaces on the wings are pitched downward to avoid the propeller wake, and the hinged surfaces on the tail boom and tail tilt for yaw control.

Figure 6:
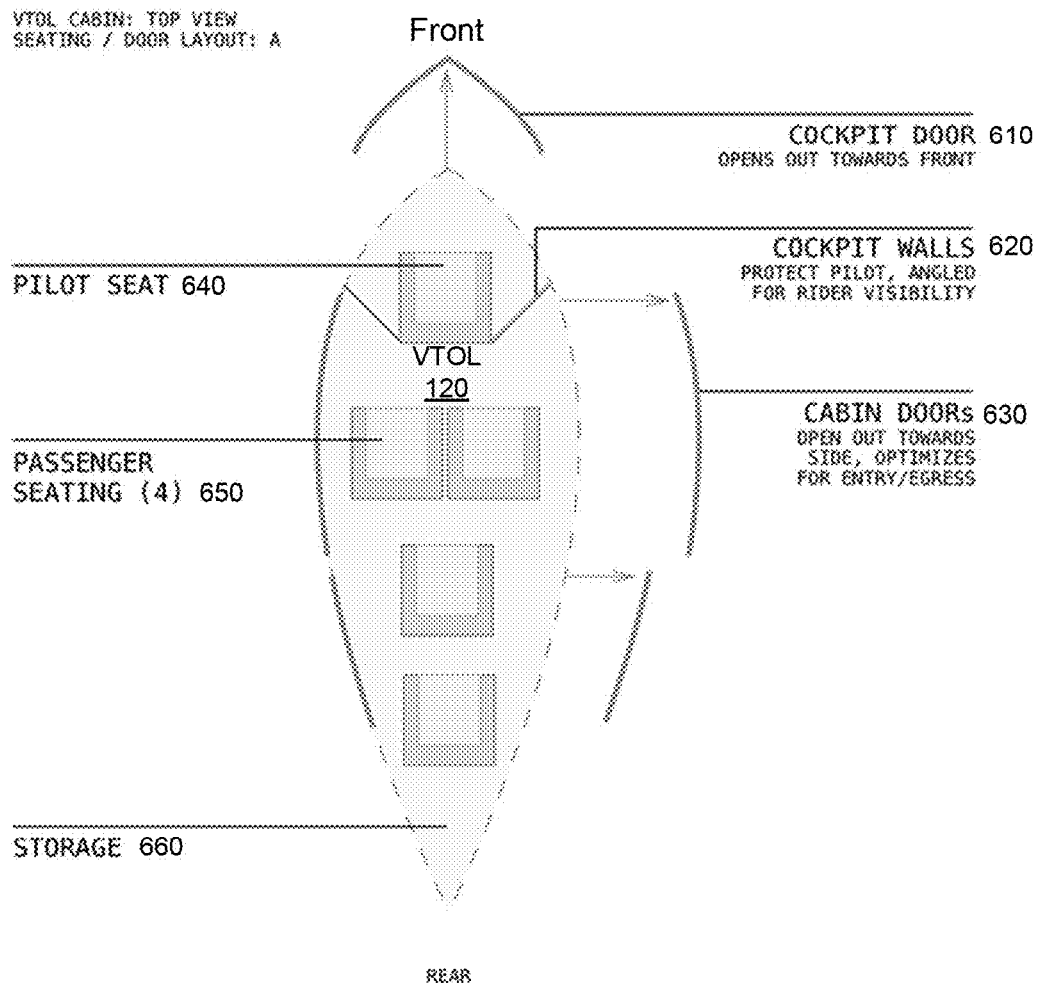
FIG. 6 is a schematic diagram of seat positions in a VTOL aircraft, according to an embodiment.
Figure 6:
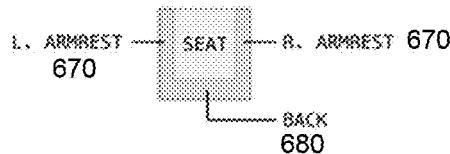

FIG. 6 is a schematic diagram of seat positions in a VTOL aircraft 120, according to an embodiment. The diagram includes a cockpit door 610, cockpit walls 620, cabin doors 630, a pilot seat 640, passenger seats 650, and a storage area 660. Furthermore, each seat includes armrests 670 and a back 680. The size, shape, number, and arrangement of objects of the VTOL aircraft 120 may be different than illustrated. For example, there may be more or less seats within the VTOL aircraft 120. In another example, one or more seats may face the rear of the VTOL aircraft 120.

Figure 7:
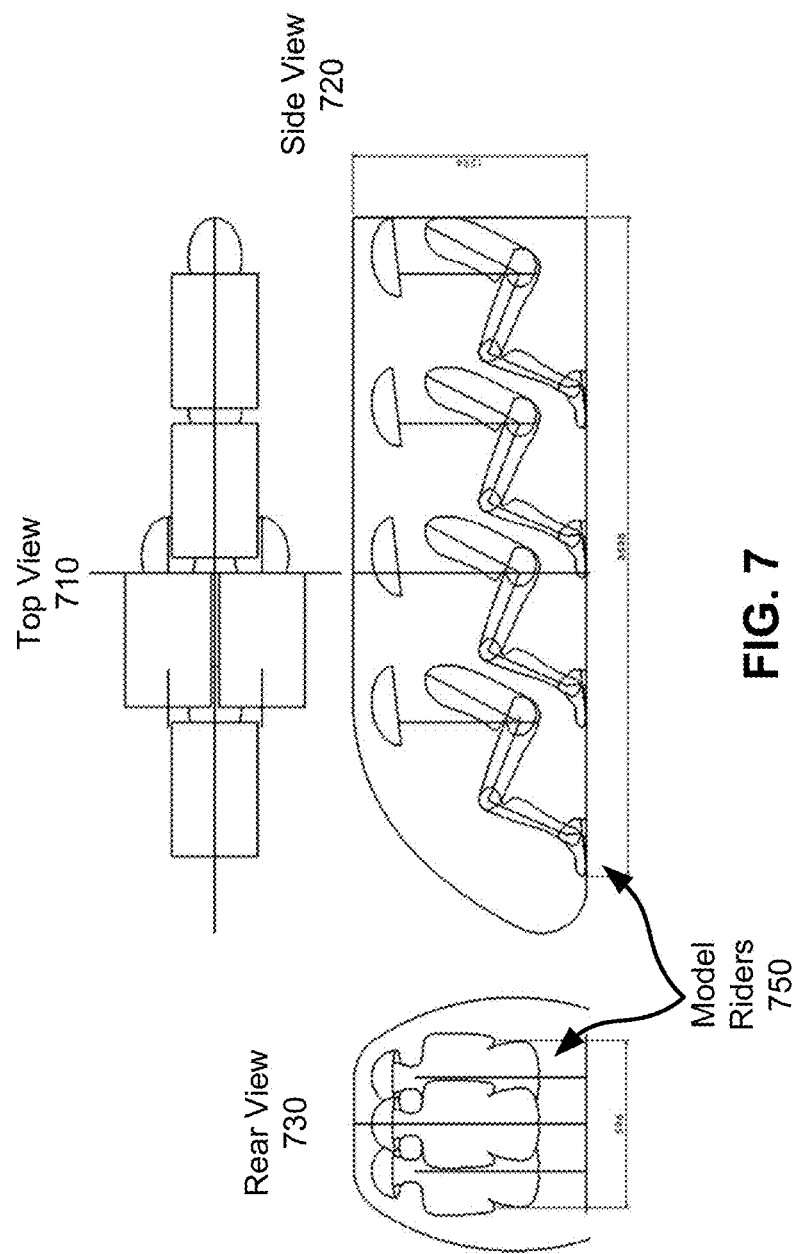
FIG. 7 illustrates views of the seat positions illustrated in FIG. 6, according to an embodiment.

FIG. 7 illustrates views of the seat positions illustrated in FIG. 6, according to an embodiment. The diagram includes a top view 710, side view 720, and rear view 730 of the seat positions. Additionally, the side view 720 and rear view 730 include model riders 750 sitting at the seat positions.

Payloads are assigned in order to meet criteria for safe loading of the vehicle. Based on weight estimates of payloads associated with riders, the riders can be assigned to passenger seats 650 in the VTOL aircraft 120. Based on weight updates of payloads associated with riders, the riders can be reassigned to different passenger seats 650 in the VTOL aircraft 120 (or a different VTOL aircraft) in the event the original assignment does not result in a weight distribution within the safety criteria. As described above, in some embodiments, the weight distribution of the VTOL aircraft 120 is modified by adjusting the positions of seats within the aircraft. The seat positions can be adjusted to adjust the weight distribution to meet the weight distribution thresholds of the VTOL aircraft 120. For example, a seat includes mechanical sliders to shift a seat closer to the front or rear of the aircraft 120.

In addition to passenger seats 650, the VTOL aircraft 120 can include luggage compartments. In some embodiments, based on the weight estimates or updates of the luggage, the luggage can be assigned and reassigned to locations within the luggage compartments to satisfy weight distribution criteria of the aircraft 120. For example, heavier luggage may be assigned to the storage area 660 or under the passenger seats 650 (e.g., to lower the center of gravity of the aircraft 120). Additionally, as described above, the positions of luggage and luggage compartments can be modified (e.g., by one or more actuators). Furthermore, other aircraft components, such as ballast tanks, counterweights, and fuel bladders may be adjusted to alter the weight distribution of the aircraft.

Example Methods

Figure 8:
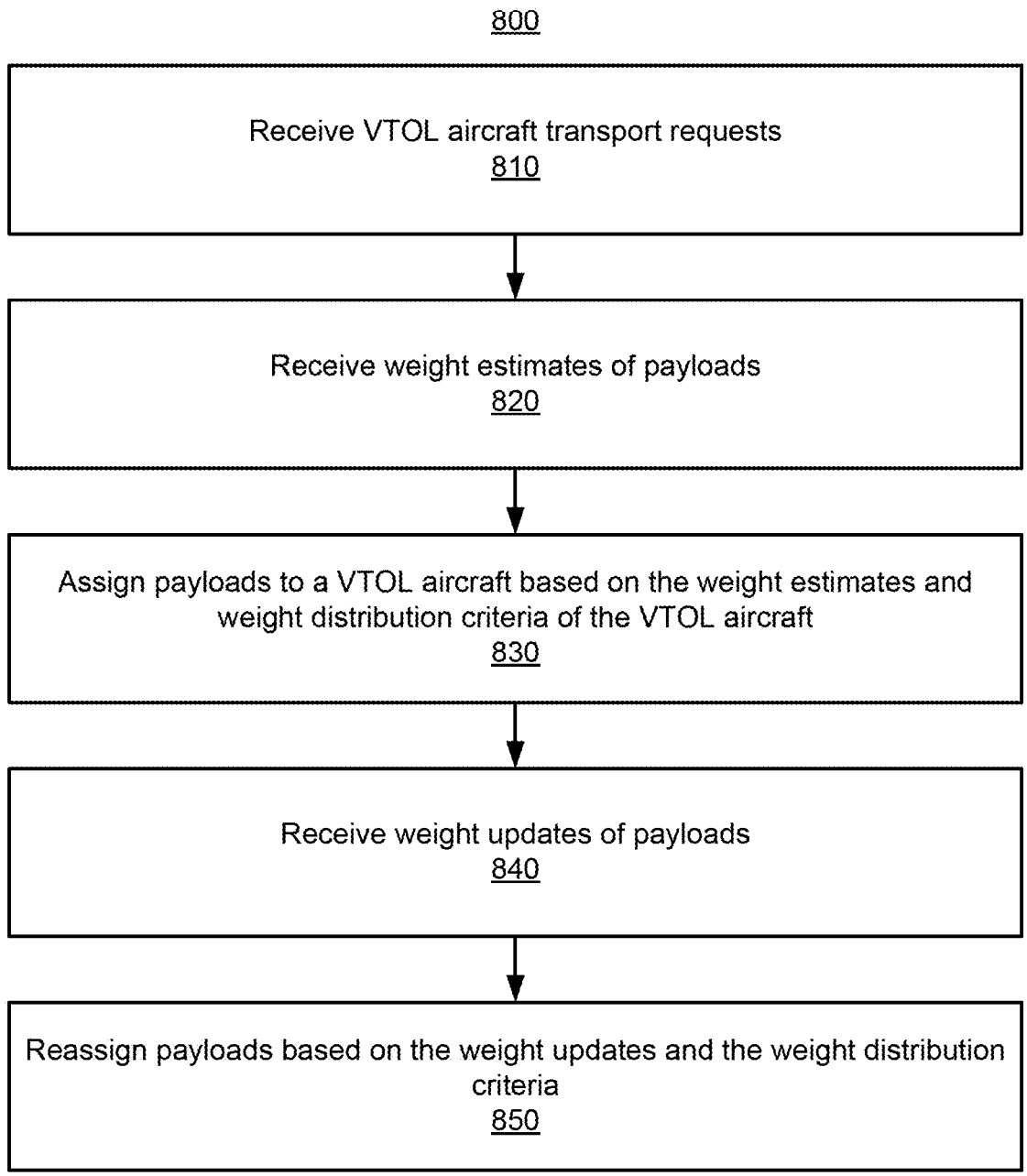
FIG. 8 is a flow chart illustrating a method for dynamically assigning payloads associated with riders to VTOL aircraft, according to an embodiment.

FIG. 8 is a flow chart illustrating a method 800 for dynamically assigning payloads associated with riders to VTOL aircraft, according to an embodiment. The method 800 can facilitate safe operation of the VTOL aircraft by ensuring that the VTOL aircraft is loaded in a safe manner. The steps of method 800 may be performed in different orders, and the method may include different, additional, or fewer steps.

Vertical take-off and landing (VTOL) aircraft transport requests are received 810. Weight estimates of payloads associated with riders are received 820. A weight estimate of a payload can be based on at least one of a rider submission and a weight measurement determined prior to the rider submitting a VTOL aircraft transport request. A weight estimate of a payload may be based on at least one of a day of the week and a time of the day.

Payloads associated with the riders are assigned 830 to a VTOL aircraft based on the weight estimates of payloads associated with the riders and weight distribution criteria of the VTOL aircraft. The total weight of the VTOL aircraft satisfies the weight distribution criteria of the VTOL aircraft, and the total weight of the VTOL is determined from the weight estimates.

Weight updates are received. The weight updates include updated weights of the payloads associated with the riders. In some embodiments, the weight updates are determined, prior to the riders boarding the VTOL aircraft. In some embodiments, the weight updates are determined, subsequent to the riders boarding the VTOL aircraft.

Payloads associated with the riders are reassigned 850 based on the weight updates and the weight distribution criteria. The total weight of the VTOL aircraft satisfies weight distribution criteria of the VTOL aircraft, and the total weight of the VTOL is determined from the weight updates. In some embodiments, reassigning the payload includes changing a designated location for luggage associated with the rider.

The weight distribution criteria can include a weight distribution threshold, and reassigning the payload associated with the riders can include assigning riders to seats within the VTOL aircraft based on the weight estimates and the weight distribution threshold of the VTOL aircraft. A weight distribution of the VTOL aircraft may not exceed the weight distribution threshold of the VTOL aircraft, and the weight distribution of the VTOL aircraft can be determined from positions of the seats within the VTOL aircraft and the weight estimates of payloads associated with the riders.

In some embodiments, reassigning the payload associated with the riders includes reassigning riders to different seats within the VTOL aircraft based on the weight updates and the weight distribution threshold of the VTOL aircraft, wherein the weight distribution of the VTOL aircraft are determined from the positions of the seats within the VTOL aircraft and the weight updates of payloads associated with the riders.

In some embodiments, the weight distribution of the VTOL aircraft is modified by adjusting positions of the seats within the VTOL aircraft to lower the weight distribution of the VTOL aircraft below the distribution threshold of the VTOL aircraft. In some embodiments, the weight distribution of the VTOL aircraft is modified by adjusting positions of the riders' luggage or internal components of the VTOL aircraft.

Figure 9:
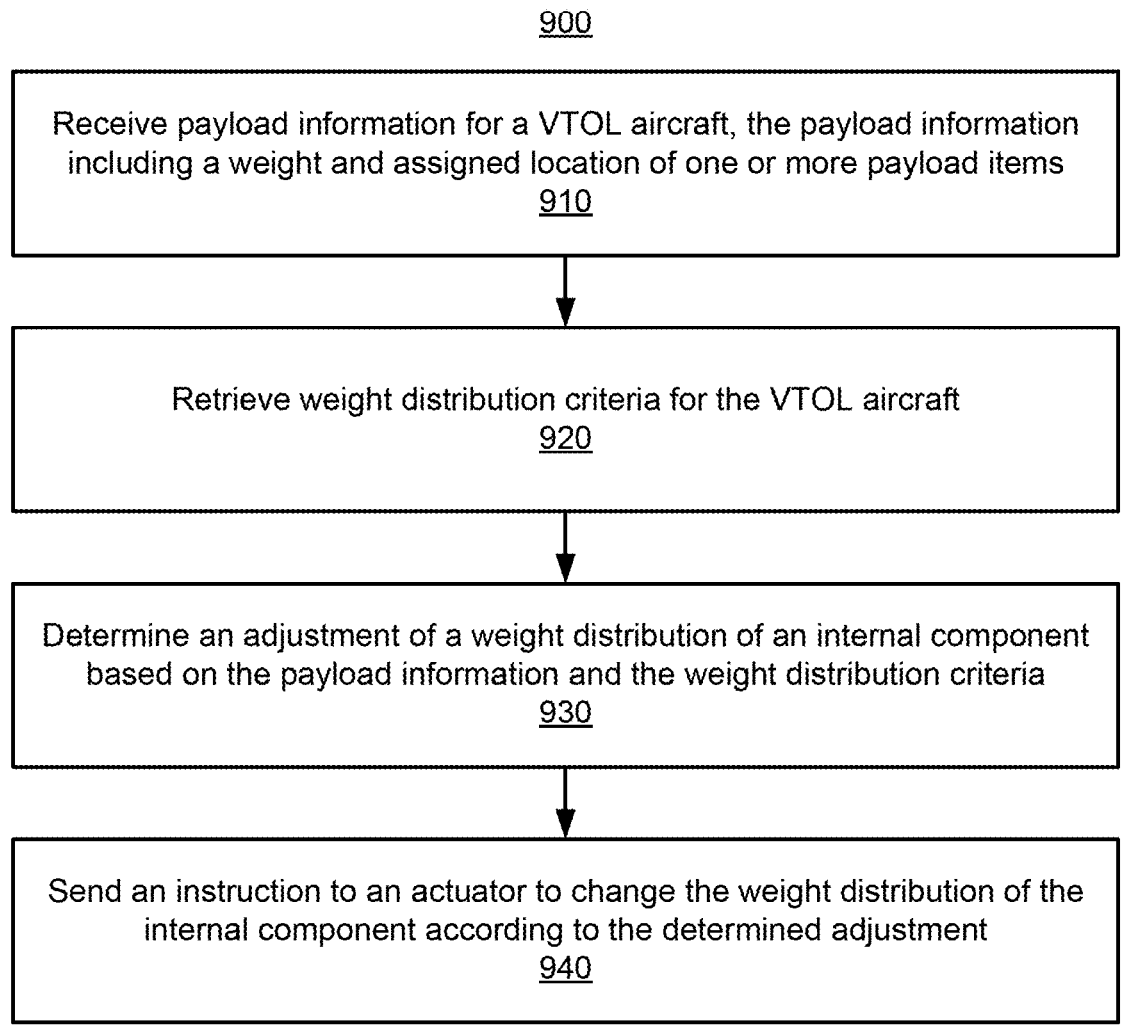
FIG. 9 is a flow chart illustrating a method for adjusting internal components of a VTOL aircraft, according to an embodiment.

FIG. 9 is a flow chart illustrating a method 900 for adjusting an internal component of a VTOL aircraft, according to an embodiment. The steps of method 900 may be performed in different orders, and the method may include different, additional, or fewer steps.

Payload information for a vertical take-off and landing (VTOL) aircraft is received 910. The payload information includes a weight and assignment location of one or more payload items. The payload information any combination of a weight estimate, one or more weight updates, and one or more assigned positions of payloads within the VTOL aircraft. In some embodiments, the payload information is received, at least in part, from a rider submission.

Weight distribution criteria for the VTOL aircraft are retrieved 920 from a data store.

An adjustment of a weight distribution of an internal component of the VTOL aircraft is determined 930 based on the payload information and the weight distribution criteria.

An instruction is sent 940 to an actuator to change the weight distribution of the internal component according to the determined adjustment.

In some embodiments, the internal component is a seat of the VTOL aircraft and the adjustment of the weight distribution includes an actuator changing a position of the seat, the change of position based on the payload information and the weight distribution criteria.

In some embodiments, the internal component includes a ballast tank, and wherein adjusting the weight distribution comprises filling the ballast tank with an amount of fluid, wherein the amount is based on the payload information and the weight distribution criteria. In some embodiments, the ballast tank is integrated into a seat of the VTOL aircraft. In some embodiments, the fluid is a coolant.

Computing System Architecture

Figure 10:
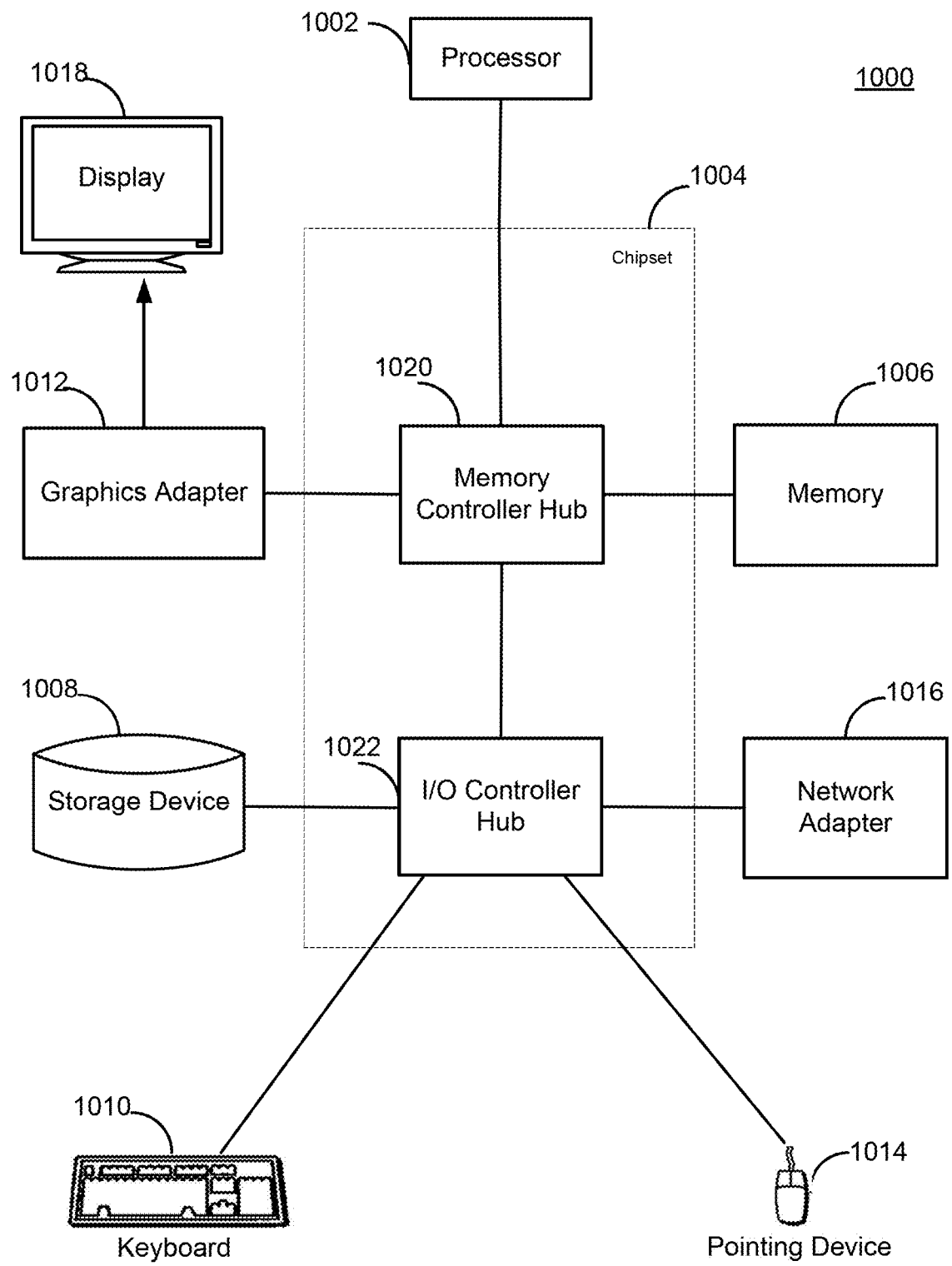
FIG. 10 is a high-level block diagram illustrating an example computer suitable for use within the computing environment.

FIG. 10 is a high-level block diagram illustrating an example computer 1000 suitable for use within the computing environment 100. The example computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

In the embodiment shown in FIG. 10, the storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, touch-screen, or other type of pointing device, and is used in combination with the keyboard 1010 (which may be an on-screen keyboard) to input data into the computer system 1000. The graphics adapter 1012 displays images and other information on the display 1018. The network adapter 1016 couples the computer system 1000 to one or more computer networks.

The types of computers used by the entities of FIGS. 1 through 9 can vary depending upon the embodiment and the processing power required by the entity. For example, the transport services coordination system 115 might include multiple computers 1000 working together to provide the functionality described. Furthermore, the computers 1000 can lack some of the components described above, such as keyboards 1010, graphics adapters 1012, and displays 1018.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
receiving payload information for a particular vertical take-off and landing (VTOL) aircraft of a plurality of VTOL aircraft, wherein the payload information includes:
a weight of a rider assigned to a seat within a cabin of the particular VTOL aircraft, the seat having a first seat position and a second seat position; and
a weight of a payload item associated with the rider, the payload item having an assigned location within a storage compartment of the particular VTOL aircraft, the storage compartment being separate from the cabin of the particular VTOL aircraft;
retrieving weight distribution criteria for the particular VTOL aircraft;
determining an adjustment to a weight distribution of the particular VTOL aircraft based, at least in part, on the payload information and the weight distribution criteria;
sending a first instruction to a payload actuator to change the assigned location of the payload item within the storage compartment from a first payload position to a second payload position according to the determined adjustment; and
sending a second instruction to a seat actuator to adjust a position of the seat within the cabin of the particular VTOL aircraft from the first seat position to the second seat position according to the determined adjustment.

2. The method of claim 1, wherein the payload information is received, at least in part, from a rider submission.

3. The method of claim 1, wherein the second payload position is determined subsequent to the rider sitting in the seat of the particular VTOL aircraft.

4. The method of claim 1, further comprising adjusting the weight distribution by causing a ballast tank to be filled with an amount of fluid, wherein the amount of fluid is based, at least in part, on the payload information and the weight distribution criteria.

5. The method of claim 4, wherein the ballast tank is integrated into the seat of the particular VTOL aircraft.

6. The method of claim 4, wherein the fluid is a coolant.

7. The method of claim 1, further comprising forecasting a power requirement of the particular VTOL aircraft based, at least in part, on the payload information.

8. A method, comprising:
receiving payload information for a particular vertical take-off and landing (VTOL) aircraft of a plurality of VTOL aircraft, wherein the payload information includes:

a weight of a rider assigned to a seat within a cabin of the particular VTOL aircraft, the seat having a first seat position and a second seat position; and a weight of a payload item associated with the rider, the payload item having an assigned location within a storage compartment of the particular VTOL aircraft, the storage compartment being separate from the cabin of the particular VTOL aircraft;

retrieving weight distribution criteria for the particular VTOL aircraft;

receiving sensor information indicating a weight distribution of the particular VTOL aircraft;

determining an adjustment to the weight distribution of the particular VTOL aircraft based, at least in part, on the payload information and the weight distribution criteria;

sending a first instruction to a payload actuator to change the assigned location of the payload item within the storage compartment from a first payload position to a second payload position according to the determined adjustment; and sending a second instruction to a seat actuator to adjust a position of the seat within the cabin of the particular VTOL aircraft from the first seat position to the second seat position according to the determined adjustment.

9. The method of claim 8, wherein the payload information is received, at least in part, from a rider submission.

10. The method of claim 8, wherein the position of the seat is adjusted subsequent to the rider sitting in the seat.

11. The method of claim 8, further comprising adjusting the weight distribution by causing a ballast tank to be filled with an amount of fluid, wherein the amount of fluid is based, at least in part, on the payload information and the weight distribution criteria.

12. The method of claim 11, wherein the ballast tank is integrated into the seat of the particular VTOL aircraft.

13. The method of claim 11, wherein the fluid is a coolant.

14. The method of claim 8, further comprising forecasting a power requirement of the particular VTOL aircraft based, at least in part, on the payload information.

15. A computer system, comprising:
one or more processors; and
a memory storing instructions that, when executed by the one or more processors, perform operations, comprising:

receiving payload information for a particular vertical take-off and landing (VTOL) aircraft of a plurality of VTOL aircraft, wherein the payload information includes:

a weight of a rider assigned to a seat within a cabin of the particular VTOL aircraft, the seat having a first seat position and a second seat position; and a weight of a payload item associated with the rider, the payload item having an assigned location within a storage compartment of the particular VTOL aircraft, the storage compartment being separate from the cabin of the particular VTOL aircraft;

retrieving weight distribution criteria for the particular VTOL aircraft;

determining an adjustment to a weight distribution of the particular VTOL aircraft based, at least in part, on the payload information and the weight distribution criteria;

sending a first instruction to a payload actuator to change the assigned location of the payload item within the storage compartment from a first payload position to a second payload position according to the determined adjustment; and sending a second instruction to a seat actuator to adjust a position of the seat within the cabin of the particular VTOL aircraft from the first seat position to the second seat position according to the determined adjustment.

16. The computer system of claim 15, wherein the payload information is received, at least in part, from a rider submission.

17. The computer system of claim 15, wherein the position of the seat is adjusted subsequent to the rider sitting in the seat.

18. The computer system of claim 15, further comprising adjusting the weight distribution by causing a ballast tank to be filled with an amount of fluid, wherein the amount of fluid is based, at least in part, on the payload information and the weight distribution criteria.

19. The computer system of claim 18, wherein the ballast tank is integrated into the seat of the particular VTOL aircraft.

20. The system of claim 15, further comprising instructions for forecasting a power requirement of the particular VTOL aircraft based, at least in part, on the payload information.

* * * * *